(12) United States Patent
Pritchard et al.

(10) Patent No.: US 9,109,646 B1
(45) Date of Patent: Aug. 18, 2015

(54) TRANSFER CASE WITH LEVER APPLIED SOLENOID CLUTCH ACTUATOR

(71) Applicant: BorgWarner Inc., Auburn Hills, MI (US)

(72) Inventors: Larry Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/594,405

(22) Filed: Jan. 12, 2015

(51) Int. Cl.
| | |
|---|---|
| F16D 27/115 | (2006.01) |
| F16D 27/14 | (2006.01) |
| F16D 125/28 | (2012.01) |
| F16D 125/64 | (2012.01) |

(52) U.S. Cl.
CPC ............. *F16D 27/115* (2013.01); *F16D 27/14* (2013.01); *F16D 2125/28* (2013.01); *F16D 2125/64* (2013.01); *F16D 2500/10431* (2013.01)

(58) Field of Classification Search
None
See application file for complete search history.

(56) References Cited

U.S. PATENT DOCUMENTS

| | | | | |
|---|---|---|---|---|
| 6,905,008 | B2* | 6/2005 | Kowalsky et al. | 192/35 |
| 7,992,696 | B2* | 8/2011 | Mahlberg et al. | 192/48.3 |
| 8,490,769 | B2 | 7/2013 | Pritchard et al. | |
| 2010/0236888 | A1* | 9/2010 | Pritchard et al. | 192/35 |
| 2011/0036677 | A1* | 2/2011 | Kriebernegg et al. | 192/70.12 |

* cited by examiner

*Primary Examiner* — Rodney H Bonck
(74) *Attorney, Agent, or Firm* — BrooksGroup

(57) ABSTRACT

A number of variations may include a transfer case comprising: a clutch pack, wherein the clutch pack includes a first plurality of clutch plates rotatably coupled with an output member, a second plurality of clutch plates interleaved with the first plurality of clutch plates and rotatably coupled with an input member, and an apply plate; a solenoid operably associated with the friction clutch pack, wherein the solenoid includes a coil and an armature; at least one lever mechanism, wherein a first end of the at least one lever mechanism is stationary and a second end is attached to and moves with the armature; and wherein when the solenoid is deenergized there is an air gap between the armature and the coil and when the solenoid is energized the armature moves toward the coil causing the first end of the lever component to engage the clutch pack.

21 Claims, 3 Drawing Sheets

TRANSFER CASE WITH LEVER APPLIED SOLENOID CLUTCH ACTUATOR

TECHNICAL FIELD

The field to which the disclosure generally relates to includes transfer cases.

BACKGROUND

A vehicle may include a transfer case.

SUMMARY OF ILLUSTRATIVE VARIATIONS

A number of variations may include a transfer case comprising: a clutch pack, wherein the clutch pack includes a first plurality of clutch plates rotatably coupled with an output member, a second plurality of clutch plates interleaved with the first plurality of clutch plates and rotatably coupled with an input member, and an apply plate; a solenoid operably associated with the friction clutch pack, wherein the solenoid includes a coil and an armature; at least one lever mechanism, wherein a first end of the at least one lever mechanism is stationary and a second end is attached to and moves with the armature; and wherein when the solenoid is deenergized there is an air gap between the armature and the coil and when the solenoid is energized the armature moves toward the coil causing the first end of the lever component to engage the clutch pack.

A number of variations may include an electromagnetic clutch assembly comprising: an input member; an output member; a first plurality of clutch plates rotatably coupled with the output member; a second plurality of clutch plates interleaved with the first plurality of clutch plates and rotatably coupled with the input member; an apply plate; a solenoid operably associated with the apply plate, wherein the solenoid includes a coil and an armature; at least one lever mechanism, wherein a first end of the at least one lever mechanism is stationary in the electromagnetic clutch assembly and a second end is attached to and moves with the armature; wherein when the solenoid is energized, the armature moves toward the coil causing the first end of the at least one lever mechanism to apply a force to the apply plate causing the first plurality of clutch plates to compress with the second plurality of clutch plates so that torque is supplied to both the input member and the output member; and wherein when the solenoid is deenergized the armature moves away from the coil so that there is an air gap between the armature and the coil which causes the first end of the at least one lever mechanism to release the force on the apply plate so that the first plurality of clutch plates and the second plurality of clutch plates decompress so that torque is supplied to the input member only.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
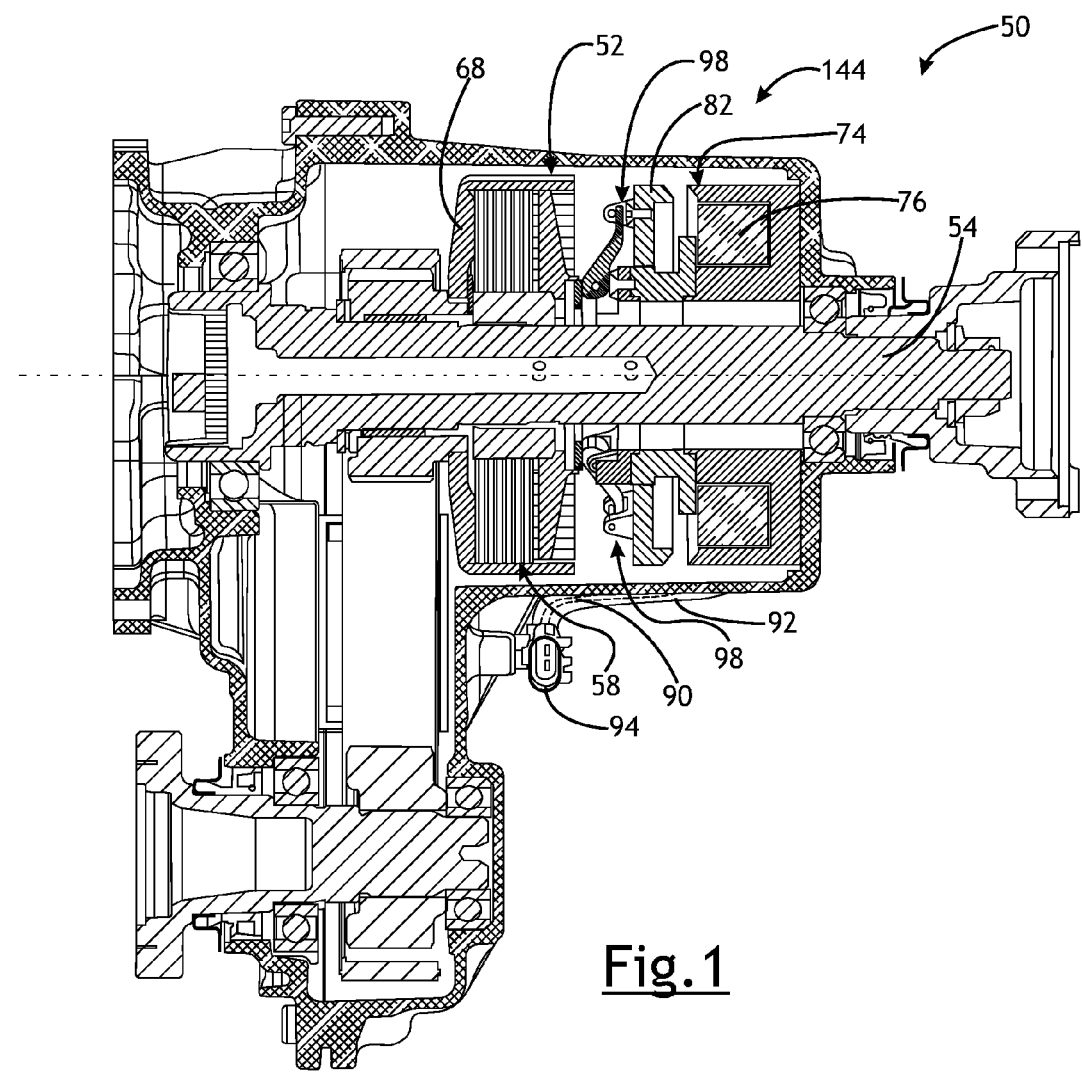
FIG. 1 illustrates a section view of a transfer case according to a number of variations.

FIG. 1 illustrates a number of variations including a transfer case 50 having an electromagnetic clutch assembly 52. The electromagnetic clutch assembly 52 may include an input member 54, an output member 68 a friction clutch pack 58, a solenoid assembly 74 comprising a coil 76 and an armature 82, and one or more lever mechanisms 98. The electromagnetic clutch assembly 52 may allow for selective control of torque to the input and output members 54, 68.

Figure 2:
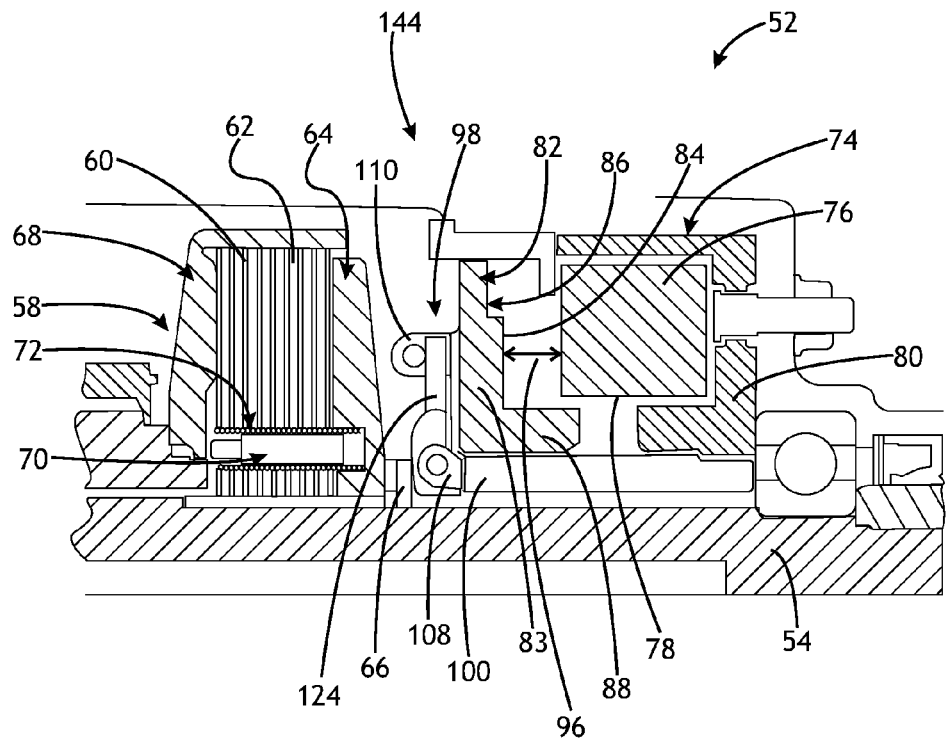
FIG. 2 illustrates a section view of a clutch assembly in an open position according to a number of variations.
Figure 3:
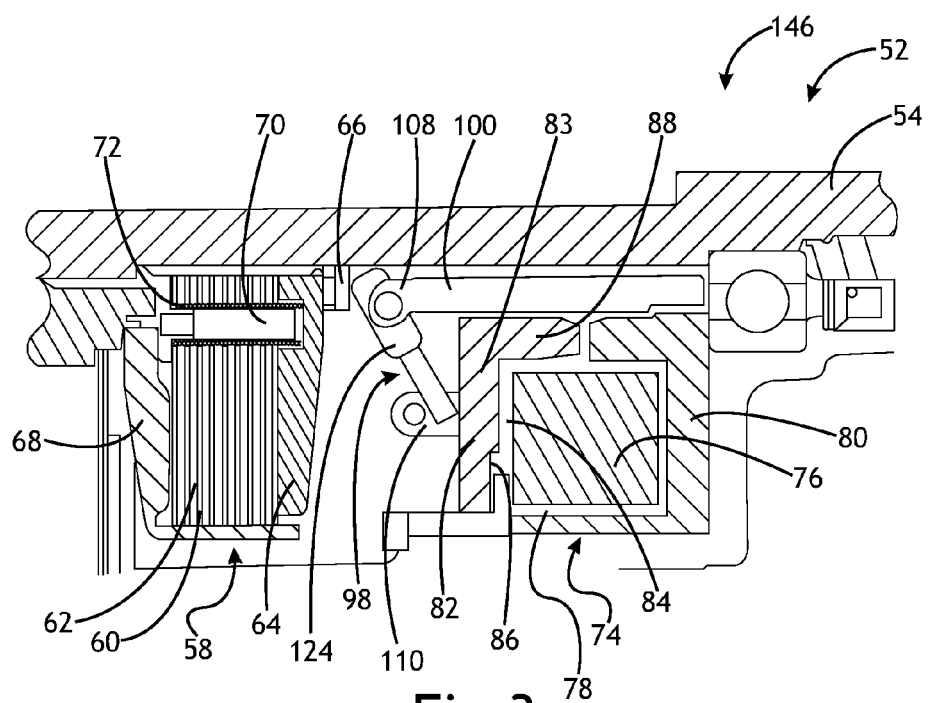
FIG. 3 illustrates a section view of a clutch assembly in an applied position according to a number of variations.

Referring to FIGS. 1-5, in a number of variations, the friction clutch pack 58 may include a first plurality of clutch plates 60 which may be rotatably coupled with the input member 54, a second plurality of clutch plates 62 interleaved with the first plurality of clutch plates 60 and rotatably coupled to the output member 68, and an apply plate 64. In a number of variations, the output member 68 may include a clutch housing which may surround at least a portion of the first plurality of clutch plates 60, the second plurality of clutch plates 62, and the apply plate 64, variations of which are illustrated in FIGS. 2-3. In a number of variations, one or more return spring guides 70 may be located within the first and second plurality of clutch plates 60, 62 and may be perpendicular to the apply plate 64. One or more return springs 72 may surround at least a portion of the one or more return spring guide pins 70 and may be operatively connected to the apply plate 64.

In a number of variations, a solenoid assembly 74 may include a coil 76 and an armature 82. In a number of variations, at least a portion of the coil 76 may be contained in a coil housing 80. The coil housing 80 may comprise a flux concentrator and may be annular. The coil 76 may be operatively attached to one or more coil wires 90 which may extend through the transfer case 50, a variation of which is illustrated in FIG. 1. The one or more coil wires 90 may be routed through a protective tube 92 and may be connected at a connector 94 which may be attached to the transfer case 50. The connector 94 may be operatively attached to any number of electrical sources known to those skilled in the art so that the one or more coil wires 90 may provide the coil 76 with an electrical current.

Figure 4:
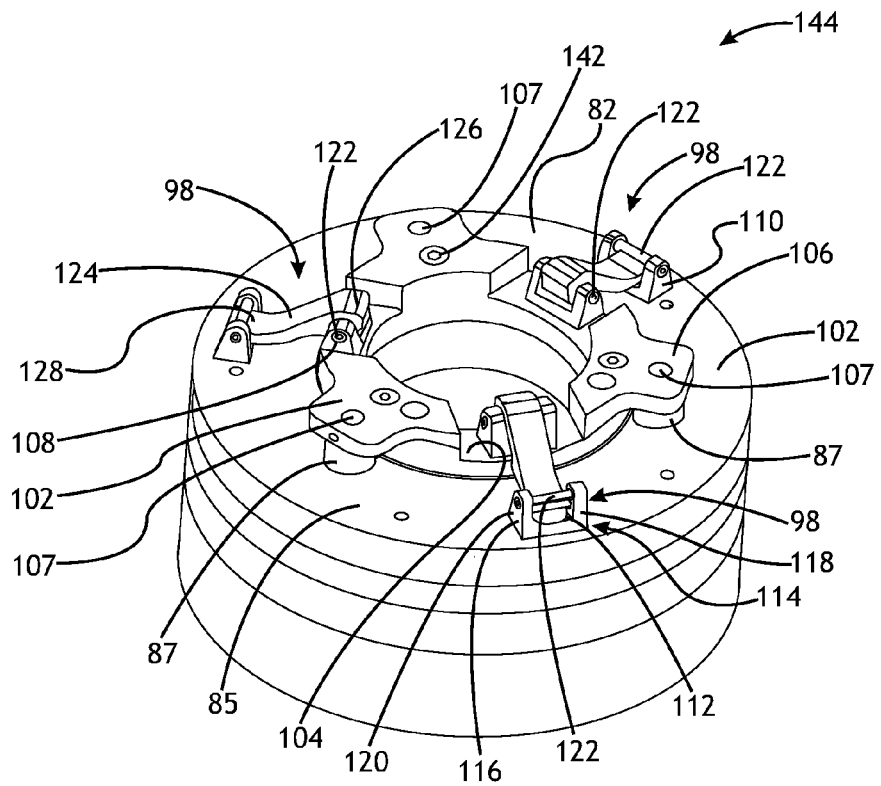
FIG. 4 illustrates a perspective view of a plurality of lever mechanisms according to a number of variations.
Figure 5:
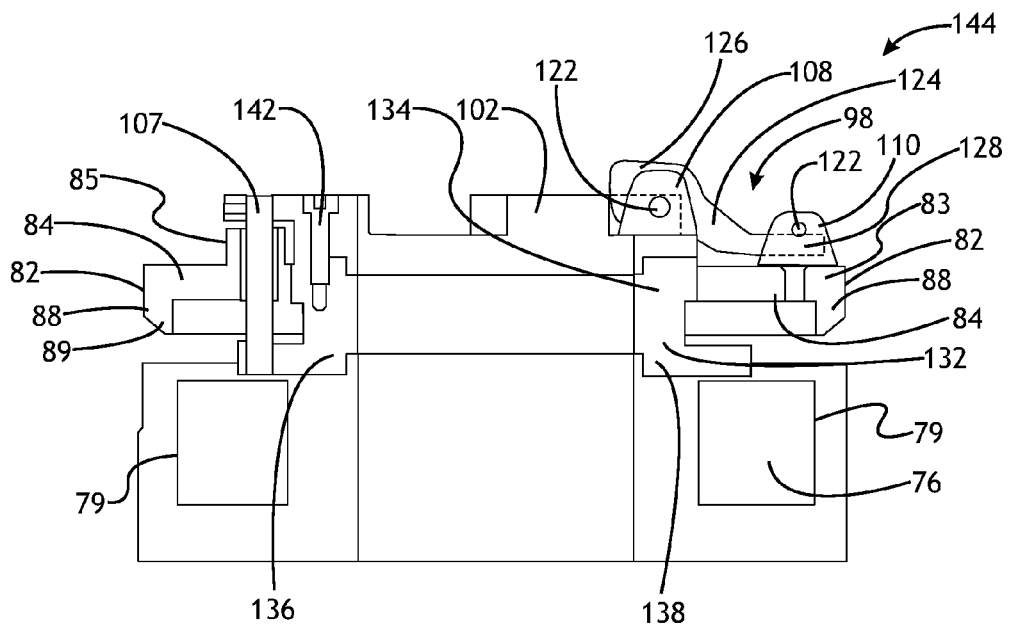
FIG. 5 illustrates a section view of a lever mechanism according to a number of variations.

In a number of variations, the armature 82 may include a base 83 and a wall 88 which may extend perpendicular from a first surface 84 of the base 83 and may be coaxial with the input member 54. In one variation, the wall 88 may extend along a portion of the inner wall 78 of the coil 76, variations of which are illustrated in FIGS. 2 and 3. In another variation, the wall 88 may extend along a portion of the outer wall 79 of the coil 76, a variation of which is illustrated in FIG. 5. The wall 88 may also include a taper 89, a variation of which is also illustrated in FIG. 5. The base 83 may include a cutout 86 which may be constructed and arranged to accommodate a portion of the coil 76, variations of which are illustrated in FIGS. 2-3. In a number of variations, the armature 82 may also include one or more extensions 87 which may extend from a second surface 85 of the base 83, a variation of which is illustrated in FIG. 4. The one or more extensions 87 may be any number of shapes including, but not limited to, cylindrical and may be aligned with one or more extensions 106 on the lever support 102, as will be discussed hereafter, so that the armature 82 may be prevented from over traveling. In a number of variations, an air gap 96 may separate the armature 82 from the coil 76 and coil housing 80 and may provide the length the armature 82 may travel. In a number of variations, the construction of the armature 82 may allow an extended range air gap 96 between the armature 82 and the coil 76 and coil housing 80. In one illustration, the air gap 96 may be approximately 10 mm which may allow for 10 mm of travel of the armature 82.

In a number of variations, a lever mechanism 98 may include a lever support 100, 102 a first pivot component 108, a second pivot component 110, and a lever component 124, variations of which are illustrated in FIGS. 2-5. In a number of variations, the first pivot component 108 and the second pivot component 110 may each include a base 112, a first member 118, a second member 120, and a pin 122, a variation of which is illustrated in FIG. 4. The first member 118 may extend upward from the first end 114 of the base 112 and the second member 120 may extend upward from the second end 116 of the base 112 so that the first member 118 and the second member 120 are parallel with each other. The first member 118 and the second member 120 may be any number of shapes. In one variation, the first member 118 and the second member 120 may each taper as they extend upward. The pin 122 may extend between the first member 118 and the second member 120.

In a number of variations, a lever component 124 may include a first end 126 and a second end 128, a variation of which is illustrated in FIG. 4. The lever component 124 may be any number of shapes including, but not limited to, dogleg, a variation of which is illustrated in FIG. 4, planar, a variation of which is illustrated in FIGS. 2-3, bent, and/or curved. In a number of variations, the lever component 124 may taper as it extends from the first end 126 to the second end 128, a variation of which is illustrated in FIG. 4. The first end 126 may be rotatably attached to the pin 122 on the first pivot component 108 component and may be constructed and arranged to engage the apply plate 64. The second end 128 of the lever component 124 may be constructed and arranged to sit below the pin 122 on the second pivot component 110.

In a number of variations, the first pivot component 108 may be attached to the lever support 100, 102 and may be stationary. In one variation, the lever support 100 may be cylindrical and may extend along a portion of the input member 54, variations of which are illustrated in FIGS. 2-3. The cylindrical lever support 100 may be constructed and arranged to engage a portion of the solenoid coil housing 80. In another variation, the lever support 102 may be an annular disk, variations of which are illustrated in FIGS. 4 and 5. The annular disk lever support 102 may include one or more cutouts 104 which may be constructed and arranged to accommodate a first pivot component 108. The annular disk lever support 102 may also include one or more extensions 106 which may protrude outward from the annular disk lever support 102 and may act as a stop feature for the extensions 87 on the armature 82, a variation of which is illustrated in FIG. 4. In a number of variations, a pin 107 may extend through the extension 106 on the annular disk lever support 102 and the extension 87 on the armature 82 so that the armature 82 may move along the pin 107 which may provide an alignment feature. In a number of variations, the annular disk lever support 102 may be attached to a guide plate 132 which may be adjacent the solenoid coil 76, a variation of which is illustrated in FIG. 5. The guide plate 132 may be cylindrical and may include a first end 134 and a second end 136. A flange 138 may extend outward from the second end 136 of the guide plate 132. The annular disk lever plate 102 may be attached to the first end 134 of the guide plate 132 in any number of variations including, but not limited to, one or more mechanical fasteners 142.

In a number of variations, the second pivot component 110 may be attached to the armature 82, variations of which are illustrated in FIGS. 2-5, and may move with the armature 82, as will be discussed hereafter.

Referring to FIGS. 2-3, in a number of variations, an electrical source may send current through one or more coil wires 90 so that current may be passed through the solenoid coil 76 which may generate a magnetic field. The magnetic field generated by the solenoid coil 76 may cause the armature 82 to be attracted to the solenoid coil 76 so that it may move axially from a first position 144 to a second position 146. As the armature 82 moves from the first position 144 to the second position 146, the second pivot component 110 may also move axially from the first position 144 to the second position 146. The movement of the first pivot component 108 to the second position 146 may cause the first end 126 of the lever component 124 to rotate axially so that it may contact the apply plate 64 in the friction clutch pack 58. The force transmitted by the first end 126 of the lever component 124 to the apply plate 64 may cause the first and second plurality of clutch plates 60, 62 in the friction clutch pack 58 to compress together so that the friction clutch pack 58 may be engaged or applied. The force transmitted by the first end 126 of the lever component 124 may also cause the return spring 72 to compress. In a number of variations, the apply plate 64 may include an actuation member 66 which may extend from the apply plate 64 adjacent the first end 126 of the lever component 124 which may increase the force applied to the friction clutch pack 58. The engagement of the friction clutch pack 58 may allow torque to be provided to both the input member 54 and the output member 68. A person having ordinary skill in the art would recognize that the use of more than one lever mechanism 98 may provide a more evenly distributed force which may be transmitted to the friction clutch pack 58.

In a number of variations, the solenoid coil 76 may be deenergized so that current may no longer be supplied to the solenoid coil 76 so that the solenoid coil 76 may no longer generate a magnetic field. This may release the armature 82 from being attracted to the solenoid coil 76 so that the armature 82 may return to the first position 144. The second pivot component 110 may then also return to the first position 144 which may cause the first end 126 of the lever component 124 to rotate away from the apply plate 64. The one or more return springs 72 may also decompress and may apply a force to the apply plate 64 so that the apply plate 64 may allow the first plurality of clutch plates 60 and the second plurality of clutch plates 62 to disengage from each other. This may cause the friction clutch pack 58 to be disengaged or open so that torque may be provided to the input member 54 only.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a transfer case comprising: a clutch pack, wherein the clutch pack includes a first plurality of clutch plates rotatably coupled with an output member, a second plurality of clutch plates interleaved with the first plurality of clutch plates and rotatably coupled with an input member, and an apply plate; a solenoid operably associated with the friction clutch pack, wherein the solenoid includes a coil and an armature; at least one lever mechanism, wherein a first end of the at least one lever mechanism is stationary and a second end is attached to and moves with the armature; and wherein when the solenoid is deenergized there is an air gap between the armature and the coil and when the solenoid is energized the armature moves toward the coil causing the first end of the lever component to engage the clutch pack.

Variation 2 may include a transfer case as set forth in Variation 1 wherein when the clutch pack is engaged, torque is applied to the input member and the output member.

Variation 3 may include a transfer case as set forth in any of Variations 1-2 wherein the at least one lever mechanism further comprises: a lever support, wherein the lever support surrounds a portion of the input member and is stationary in the transfer case; a first pivot component; a second pivot component; a lever component, wherein the lever component includes a first end rotatably attached to the first pivot component and a second end operably associated with the second pivot component; and wherein the first pivot component is attached to the lever support and the second pivot component is attached to the armature.

Variation 4 may include a transfer case as set forth in Variation 3 wherein the lever component is constructed and arranged to form a dogleg shape.

Variation 5 may include a transfer case as set forth in any of Variations 1-4 wherein the armature includes a base and a wall which extends from a first surface of the base and which is coaxial with the input member.

Variation 6 may include a transfer case as set forth in Variation 5 wherein the armature wall extends along an inner wall of the solenoid coil.

Variation 7 may include a transfer case as set forth in Variation 5 wherein the armature wall extends along an outer wall of the solenoid coil.

Variation 8 may include a transfer case as set forth in any of Variations 1-7 wherein the armature includes one or more extensions which extend from a second surface of the armature.

Variation 9 may include a transfer case as set forth in any of Variations 1-8 wherein the solenoid assembly further comprises a housing which surrounds a portion of the solenoid coil.

Variation 10 may include a transfer case as set forth in any of Variations 3-9 wherein the lever support is cylindrical and engages a portion of the solenoid assembly.

Variation 11 may include a transfer case as set forth in any of Variations 3-9 wherein the lever support is an annular disk.

Variation 12 may include a transfer case as set forth in Variation 11 wherein the lever support is attached to a guide plate.

Variation 13 may include a transfer case as set forth in any of Variations 11-12 wherein the lever support includes at least one cutout which is constructed and arranged to accommodate the one or more first pivot components.

Variation 14 may include a transfer case as set forth in any of Variations 3-13 wherein the lever support and the armature include at least one stop feature.

Variation 15 may include a transfer case as set forth in any of Variations 3-14 wherein the lever support and the armature include at least one alignment feature.

Variation 16 may include a transfer case as set forth in any of Variations 1-15 wherein the solenoid further comprises at least one coil wire, and wherein an electrical source sends current through the at least one coil wire to energize the solenoid coil.

Variation 17 may include a transfer case as set forth in any of Variations 1-16 wherein the clutch pack further comprises at least one return spring guide and at least one return spring.

Variation 18 may include an electromagnetic clutch assembly comprising: an input member; an output member; a first plurality of clutch plates rotatably coupled with the output member; a second plurality of clutch plates interleaved with the first plurality of clutch plates and rotatably coupled with the input member; an apply plate; a solenoid operably associated with the apply plate, wherein the solenoid includes a coil and an armature; at least one lever mechanism, wherein a first end of the at least one lever mechanism is stationary in the electromagnetic clutch assembly and a second end is attached to and moves with the armature; wherein when the solenoid is energized, the armature moves toward the coil causing the first end of the at least one lever mechanism to apply a force to the apply plate causing the first plurality of clutch plates to compress with the second plurality of clutch plates so that torque is supplied to both the input member and the output member; and wherein when the solenoid is deenergized the armature moves away from the coil so that there is an air gap between the armature and the coil which causes the first end of the at least one lever mechanism to release the force on the apply plate so that the first plurality of clutch plates and the second plurality of clutch plates decompress so that torque is supplied to the input member only.

Variation 19 may include an electromagnetic clutch assembly as set forth in Variation 18 wherein the at least one lever mechanism further comprises: a lever support, wherein the lever support surrounds a portion of the input member and is stationary in the transfer case; a first pivot component; a second pivot component; a lever component, wherein the lever component includes a first end rotatably attached to the first pivot component and a second end operably associated with the second pivot component; and wherein the first pivot component is attached to the lever support and the second pivot component is attached to the armature.

Variation 20 may include an electromagnetic clutch assembly as set forth in any of Variations 18-19 wherein the clutch pack further comprises at least one return spring guide and at least one return spring.

The above description of select variations within the scope of the invention is merely illustrative in nature and, thus, variations or variants thereof are not to be regarded as a departure from the spirit and scope of the invention.

What is claimed is:
1. A transfer case comprising:
a clutch pack, wherein the clutch pack includes a first plurality of clutch plates rotatably coupled with an output member, a second plurality of clutch plates interleaved with the first plurality of clutch plates and rotatably coupled with an input member, and an apply plate;
a solenoid operably associated with the friction clutch pack, wherein the solenoid includes a coil and an armature;
at least one lever mechanism, wherein a first end of the at least one lever mechanism is stationary and a second end is attached to and moves with the armature; and wherein when the solenoid is deenergized there is an air gap between the armature and the coil and when the solenoid is energized the armature moves toward the coil causing the first end of the lever component to engage the clutch pack.

2. The transfer case of claim 1 wherein when the clutch pack is engaged, torque is applied to the input member and the output member.

3. The transfer case of claim 1 wherein the at least one lever mechanism further comprises:
a lever support, wherein the lever support surrounds a portion of the input member and is stationary in the transfer case;
a first pivot component;
a second pivot component;
a lever component, wherein the lever component includes a first end rotatably attached to the first pivot component and a second end operably associated with the second pivot component; and
wherein the first pivot component is attached to the lever support and the second pivot component is attached to the armature.

4. The transfer case of claim 3 wherein the lever component is constructed and arranged to form a dogleg shape.

5. The transfer case of claim 3 wherein the lever support is an annular disk.

6. The transfer case of claim 5 wherein the lever support is attached to a guide plate.

7. The transfer case of claim 5 wherein the lever support includes at least one cutout which is constructed and arranged to accommodate the one or more first pivot components.

8. The transfer case of claim 3 wherein the lever support and the armature include at least one stop feature.

9. The transfer case of claim 3 wherein the lever support and the armature include at least one alignment feature.

10. The transfer case of claim 1 wherein the armature includes a base and a wall which extends from a first surface of the base and which is coaxial with the input member.

11. The transfer case of claim 10 wherein the armature wall extends along an inner wall of the solenoid coil.

12. The transfer case of claim 10 wherein the armature wall extends perpendicularly from an outer perimeter of the base.

13. The transfer case of claim 1 wherein the armature includes one or more extensions which extend perpendicularly from a surface of the armature.

14. The transfer case of claim 1 wherein the solenoid assembly further comprises a housing which surrounds a portion of the solenoid coil.

15. The transfer case of claim 1 wherein the solenoid further comprises at least one coil wire, and wherein an electrical source sends current through the at least one coil wire to energize the solenoid coil.

16. The transfer case of claim 1 wherein the clutch pack further comprises at least one return spring guide and at least one return spring.

17. An electromagnetic clutch assembly comprising:
an input member;
an output member;
a first plurality of clutch plates rotatably coupled with the output member;
a second plurality of clutch plates interleaved with the first plurality of clutch plates and rotatably coupled with the input member;
an apply plate;
a solenoid operably associated with the apply plate, wherein the solenoid includes a coil and an armature;
at least one lever mechanism, wherein a first end of the at least one lever mechanism is stationary in the electromagnetic clutch assembly and a second end is attached to and moves with the armature;
wherein when the solenoid is energized, the armature moves toward the coil causing the first end of the at least one lever mechanism to apply a force to the apply plate causing the first plurality of clutch plates to compress with the second plurality of clutch plates so that torque is supplied to both the input member and the output member; and
wherein when the solenoid is deenergized the armature moves away from the coil so that there is an air gap between the armature and the coil which causes the first end of the at least one lever mechanism to release the force on the apply plate so that the first plurality of clutch plates and the second plurality of clutch plates decompress so that torque is supplied to the input member only.

18. The electromagnetic clutch of claim 17 wherein the at least one lever mechanism further comprises:
a lever support, wherein the lever support surrounds a portion of the input member and is stationary in a transfer case;
a first pivot component;
a second pivot component;
a lever component, wherein the lever component includes a first end rotatably attached to the first pivot component and a second end operably associated with the second pivot component; and
wherein the first pivot component is attached to the lever support and the second pivot component is attached to the armature.

19. The electromagnetic clutch assembly of claim 17 wherein the clutch pack further comprises at least one return spring guide and at least one return spring.

20. A transfer case comprising:
a clutch pack, wherein the clutch pack includes a first plurality of clutch plates rotatably coupled with an output member, a second plurality of clutch plates interleaved with the first plurality of clutch plates and rotatably coupled with an input member, and an apply plate;
a solenoid operably associated with the friction clutch pack, wherein the solenoid includes a coil and an armature;
at least one lever mechanism, wherein a first end of the at least one lever mechanism is stationary and a second end is attached to and moves with the armature;
wherein the at least one lever mechanism further comprises:
a lever support, wherein the lever support surrounds a portion of the input member and is stationary in the transfer case and wherein the lever support is cylindrical and engages a portion of the solenoid assembly;
a first pivot component;
a second pivot component;
a lever component, wherein the lever component includes a first end rotatably attached to the first pivot component and a second end operably associated with the second pivot component;
wherein the first pivot component is attached to the lever support and the second pivot component is attached to the armature; and
wherein when the solenoid is deenergized there is an air gap between the armature and the coil and when the solenoid is energized the armature moves toward the coil causing the first end of the lever component to engage the clutch pack.

21. A transfer case comprising:
- a clutch pack, wherein the clutch pack includes a first plurality of clutch plates rotatably coupled with an output member, a second plurality of clutch plates interleaved with the first plurality of clutch plates and rotatably coupled with an input member, and an apply plate;
- a solenoid operably associated with the friction clutch pack, wherein the solenoid includes a coil and an armature, wherein the armature includes a base and a wall, wherein the wall extends perpendicularly from an outer perimeter of the base toward the solenoid and is coaxial with the input member;
- at least one lever mechanism, wherein a first end of the at least one lever mechanism is stationary and a second end is attached to and moves with the armature; and
- wherein when the solenoid is deenergized there is an air gap between the armature and the coil, and when the solenoid is energized the armature moves toward the coil and causes the first end of the lever component to engage the clutch pack.

* * * * *